US009787816B2

(12) United States Patent
Kim

(10) Patent No.: US 9,787,816 B2
(45) Date of Patent: Oct. 10, 2017

(54) METHOD FOR REPRODUCING CONTENTS AND AN ELECTRONIC DEVICE THEREOF

(71) Applicant: Samsung Electronics Co., Ltd., Gyeonggi-do (KR)

(72) Inventor: Young-Hoon Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 10 days.

(21) Appl. No.: 14/813,657

(22) Filed: Jul. 30, 2015

(65) Prior Publication Data

US 2016/0044154 A1    Feb. 11, 2016

(30) Foreign Application Priority Data

Aug. 6, 2014    (KR) .................. 10-2014-0101179

(51) Int. Cl.
| G06F 17/30 | (2006.01) |
|---|---|
| G06F 1/16 | (2006.01) |
| H04M 1/725 | (2006.01) |
| H04W 4/20 | (2009.01) |
| G06F 3/01 | (2006.01) |

(Continued)

(52) U.S. Cl.
CPC ...... *H04M 1/72527* (2013.01); *G06F 1/1684* (2013.01); *G06F 3/016* (2013.01); *G06F 3/167* (2013.01); *H04N 21/41407* (2013.01); *H04W 4/20* (2013.01)

(58) Field of Classification Search
CPC ... H04W 4/20; G06F 1/1684; G06F 17/30784
See application file for complete search history.

(56) References Cited

U.S. PATENT DOCUMENTS

| 7,689,510 B2 * | 3/2010 | Lamkin ............. G06F 17/30041 |
|---|---|---|
| | | 705/51 |
| 7,945,713 B2 * | 5/2011 | Joo ...................... G11B 27/034 |
| | | 710/15 |

(Continued)

FOREIGN PATENT DOCUMENTS

| KR | 1020080084439 | 9/2008 |
|---|---|---|
| KR | 10-0983779 | 9/2010 |
| KR | 1020100104313 | 9/2010 |

*Primary Examiner* — Asghar Bilgrami
(74) *Attorney, Agent, or Firm* — The Farrell Law Firm, P.C.

(57) ABSTRACT

An electronic device, a method of operating an electronic device, and a non-transitory computer readable recording medium are provided. The electronic device includes a memory configured to store at least one piece of content, and a processor configured to recognize an attribute corresponding to the at least one piece of content and to control an operation of the electronic device based on a basis of attribute information while the at least one piece of content is reproduced. The method includes recognizing an attribute corresponding to content to be reproduced; acquiring effect information corresponding to the attribute corresponding to the content; and applying the acquired effect information to a reproducing screen of the content. The non-transitory computer readable recording medium includes recognizing an attribute corresponding to content to be reproduced; acquiring effect information corresponding to the attribute corresponding to the content; and applying the acquired effect information to a reproducing screen of the content.

15 Claims, 10 Drawing Sheets

(51) Int. Cl.
*H04N 21/414* (2011.01)
*G06F 3/16* (2006.01)

(56) References Cited

U.S. PATENT DOCUMENTS

| | | | |
|---|---|---|---|
| 8,244,109 B2 * | 8/2012 | Kawaguchi | G11B 27/034 386/328 |
| 2006/0197764 A1 | 9/2006 | Yang | |
| 2006/0217979 A1 | 9/2006 | Pahud et al. | |
| 2008/0215310 A1 | 9/2008 | Audant | |
| 2010/0238180 A1 | 9/2010 | Kang et al. | |
| 2011/0154384 A1 * | 6/2011 | Kim | G11B 19/02 725/9 |
| 2012/0245719 A1 * | 9/2012 | Story, Jr. | G06F 3/0488 700/94 |
| 2012/0278704 A1 | 11/2012 | Ying et al. | |
| 2013/0024757 A1 | 1/2013 | Doll et al. | |
| 2014/0037117 A1 * | 2/2014 | Tsingos | H04S 5/005 381/303 |
| 2014/0355789 A1 * | 12/2014 | Bohrarper | H04R 3/00 381/119 |
| 2015/0149583 A1 * | 5/2015 | Chung | G06F 17/30029 709/217 |
| 2015/0286716 A1 * | 10/2015 | Snibbe | G06F 17/30026 707/610 |

* cited by examiner

METHOD FOR REPRODUCING CONTENTS AND AN ELECTRONIC DEVICE THEREOF

PRIORITY

This application claims priority under 35 U.S.C. §119(a) to a Korean Patent Application filed on Aug. 6, 2014 in the Korean Intellectual Property Office and assigned Serial No. 10-2014-0101179, the entire contents of which are incorporated herein by reference.

BACKGROUND

1. Field of the Invention

The present invention relates to an apparatus and method for reproducing a content, and more particularly, to an apparatus and method for controlling an operation of an electronic device in association with an attribute of a content to be reproduced, when the content is reproduced.

2. Description of the Related Art

Electronic devices for performing one or more functions in combination have increased in number in recent years. Further, a mobile terminal which is referred to as a "smart phone" is generally used as an electronic device. An electronic device such as a mobile terminal has a touch-type display module with a large-sized screen, and a high-definition camera module to capture a still picture and a moving picture, in addition to a typical function such as a communication function, and can access a network to perform web surfing. Such an electronic device has gradually evolved to include a highly effective processor, thereby being able to perform various functions.

In addition, an electronic device may reproduce various types of multimedia content such as an e-book, music, video, or the like.

According to the conventional technique, the electronic device may call a content stored in an internal or external element (in other words, a pre-stored content, a content stored in a server or another electronic device) to reproduce the content through a screen, a speaker, or the like.

The reproducing of the content may be an operation of outputting the called content in a form of audio, video, text, or the like. In addition, the reproduced content may have various types of an attribute, but the electronic device cannot provide an effect associated with the attribute of the reproduced content. For example, the electronic device may reproduce a content having an attribute associated with a specific genre (e.g., melodrama, etc.), but cannot provide an effect (e.g., adjusting of background brightness, providing of background audio, etc.) associated with the attribute while reproducing the content.

SUMMARY

The present invention has been made to address the above-mentioned problems and disadvantages, and to provide at least the advantages described below.

Accordingly, an aspect of the present invention provides an apparatus and method for controlling an operation of an electronic device in association with an attribute of a content to be reproduced, when the content is reproduced.

Another aspect of the present invention provides an apparatus and method for providing an effect associated with an attribute by controlling screen brightness, vibration, audio, or the like when a content is reproduced in an electronic device.

Another aspect of the present invention provides an apparatus and method for recognizing an attribute of a content on the basis of additional information regarding the content to be reproduced, for example, meta information, preview information, evaluation information, or the like.

Another aspect of the present invention provides an apparatus and method for recognizing an attribute of a content on the basis of a context of the content to be reproduced.

According to an aspect of the present invention, an electronic device is provided. The electronic device includes a memory configured to store at least one piece of content, and a processor configured to recognize an attribute corresponding to the at least one piece of content and to control an operation of the electronic device based a basis of attribute information while the at least one piece of content is reproduced.

According to another aspect of the present invention, a method of operating an electronic device is provided. The method includes recognizing an attribute corresponding to content to be reproduced, acquiring effect information corresponding to the attribute corresponding to the content, and applying the acquired effect information to a reproducing screen of the content.

According to another aspect of the present invention, a non-transitory computer readable recording medium for recording a program for executing operations is provided. The non-transitory computer readable recording medium includes recognizing an attribute corresponding to content to be reproduced, acquiring effect information corresponding to the attribute corresponding to the content, and applying the acquired effect information to a reproducing screen of the content.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
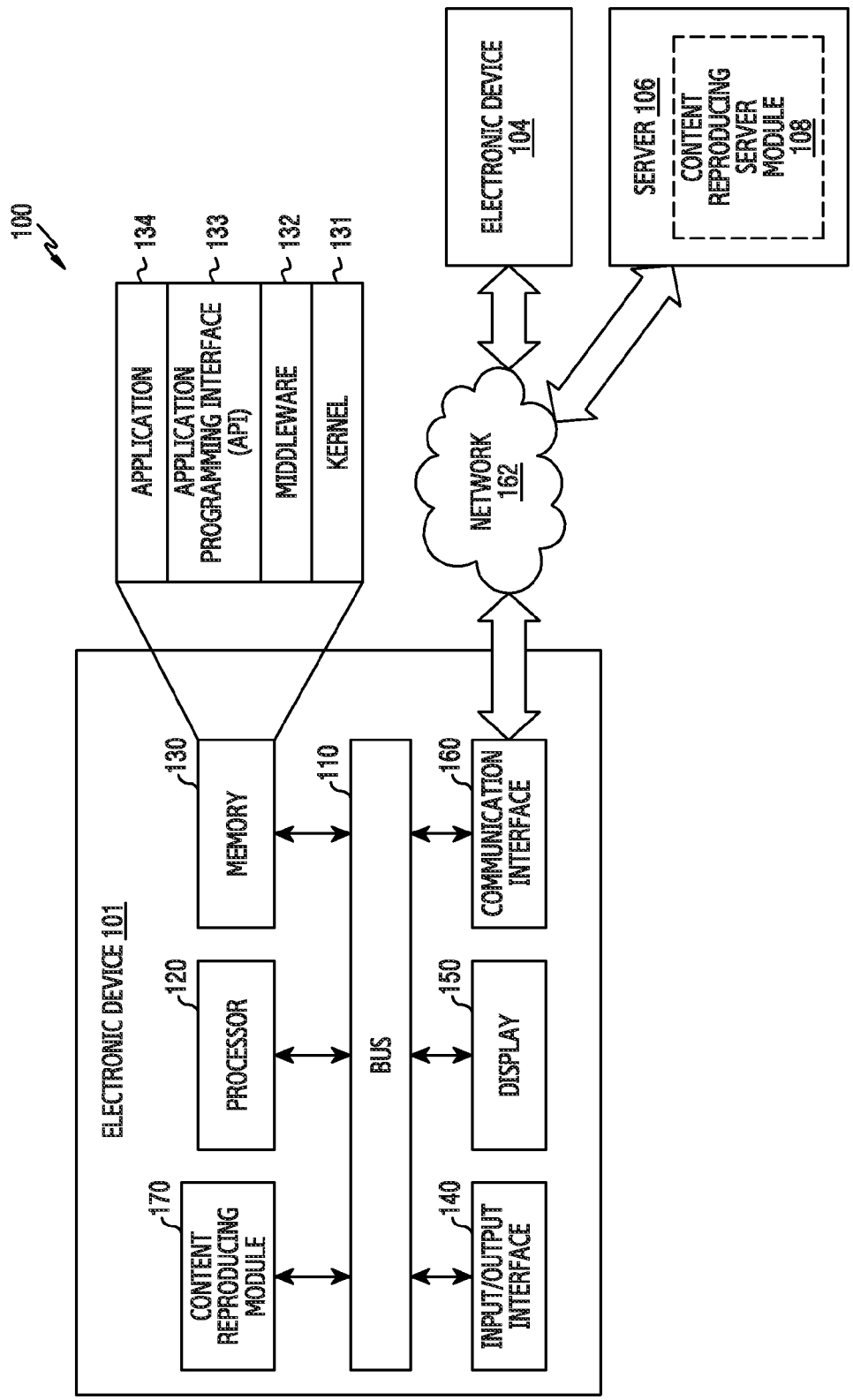
FIG. 1 is a block diagram of a network environment including an electronic device according to an embodiment of the present invention.

Hereinafter, the present invention is described with reference to the accompanying drawings. The present invention may be changed variously and have various embodiments, and certain embodiments are exemplarily described and related detailed descriptions are provided below in the present disclosure. However, it should be understood that an embodiment of the present invention is not limited to a certain embodied form and includes all modifications and/or equivalents or substitutions that fall within the scope and spirit of the present invention. In the accompanying drawings, like reference numerals are used for like elements.

Expressions such as "include" or "may include", etc. that may be used in the present disclosure indicate the existence of a disclosed relevant function, operation, or element, etc., and do not limit additional one or more functions, operations, or elements, etc. Also, it should be understood that terminologies such as "include" or "have", etc. in the present disclosure are intended for designating the existence of a characteristic, a number, a step, an operation, an element, a part, or a combination of these described in the present disclosure and do not exclude the existence or addition of one or more other characteristics, numbers, steps, operations, elements, parts, or combination of these.

An expression such as "or," etc. in the present disclosure includes a certain and all combinations of words listed together. For example, "A or B" may include A, B, or both A and B.

In the present disclosure, expressions such as "$1^{st}$," "$2^{nd}$," "first" or "second," etc. may modify various elements of the present invention but do not limit relevant elements. For example, the expressions do not limit the sequence and/or the importance, etc. of relevant elements. The expressions may be used for discriminating one element from another element. For example, both a first user apparatus and a second user apparatus are user apparatuses, and represent different user apparatuses. For example, a first element may be referred to as a second element without departing from the scope or spirit of the present invention, and similarly, the second element may be referred to as the first element.

When it is described that a certain element is "connected to" or "accesses" another element, it should be understood that the element may be directly connected to another element or may directly access another element, but that another element may exist in between. In contrast, when it is described that a certain element is "directly connected to" or "directly accesses" another element, it should be understood that another element does not exist in between.

A term used in the present disclosure is only used for explaining a certain embodiment and is not intended to limit the present invention. Unless clearly expressed otherwise, an expression of the singular includes an expression of the plural.

Unless defined differently, all terms used herein including technical or scientific terms have the same meaning as that generally understood by a person of ordinary skill in the art to which the present invention belongs. It should be understood that generally used terms defined by a dictionary have meanings coinciding with meanings in context of a related technology, and unless clearly defined in the present disclosure, they are not to be understood as having ideal or excessively formal meanings.

An electronic device according to the present invention may be a device including a communication function. For example, an electronic device may include at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical device, a camera, or a wearable device (e.g., a Head-Mounted-Device (HMD) such as electronic glasses, electronic clothing, an electronic bracelet, an electronic necklace, an electronic appcessory, an electronic tattoo, or a smartwatch).

According to an embodiment of the present invention, an electronic device may be a smart home appliance having a communication function. A smart home appliance may include, for example, at least one of a television, a Digital Video Disk (DVD) player, an audio player, a refrigerator, an air conditioner, a cleaner, an oven, an electronic range, a washing machine, an air purifier, a set-top box, a TV box (e.g., Samsung HomeSync™, Apple TV™, or Google TV™), game consoles, an electronic dictionary, an electronic key, a camcorder, or an electronic frame.

According to an embodiment of the present invention, an electronic device may include at least one of various medical devices (e.g., a Magnetic Resonance Angiography (MRA) device, a Magnetic Resonance Imaging (MRI) device, a Computed Tomography (CT) device, a shooting device, an ultrasonic device, etc.), a navigation device, a Global Positioning System (GPS) receiver, an Event Data Recorder (EDR), a Flight Data Recorder (FDR), an automobile infotainment device, electronic equipment for a ship (e.g., a navigation device for a ship, a gyro compass, etc.), an avionics device, a security device, or a robot for industrial use or home use.

According to an embodiment of the present invention, an electronic device may include at least one of a furniture or a portion of a building/structure including a communication function, an electronic board, an electronic signature receiving device, a projector, or various measurement devices (e.g., water meters, electricity meters, gas meters, or radio wave measuring devices, etc.). An electronic device according to an embodiment of the present invention may be a combination of one or more of the above-described devices. Also, it is obvious to a person of ordinary skill in the art that the electronic device according to the present invention is not limited to the above-described devices.

Hereinafter, an electronic device according to an embodiment of the present invention is described with reference to the accompanying drawings. A term of a user used in an embodiment of the present invention may indicate a person who uses an electronic device or a device (e.g., an artificial intelligence electronic device) that uses the electronic device.

FIG. 1 is a block diagram of a network environment 100 including an electronic device 101 according to an embodiment of the present invention.

Referring to FIG. 1, the electronic device 101 includes a bus 110, a processor 120, a memory 130, an Input/Output (I/O) interface 140, a display 150, a communication interface 160, and a content reproducing module 170.

The bus 110 is a circuit for connecting the above-described elements to each other, and transferring communication (e.g., a control message) between the above-described elements.

The processor 120 receives, for example, an instruction from the above-described other elements (e.g., the memory 130, the I/O interface 140, the display 150, the communication interface 160, or the content reproducing module 170, etc.) via the bus 110, deciphers the received instruction, and executes an operation or processes data corresponding to the deciphered instruction.

The memory 130 stores an instruction or data received from the processor 120 or other elements (e.g., the I/O interface 140, the display 150, the communication interface 160, or the content reproducing module 170, etc.), or generated by the processor 120 or other elements. The memory 130 includes, for example, programming modules such as a kernel 131, middleware 132, an Application Programming Interface (API) 133, or an application 134. Each of the programming modules may be configured using software, firmware, hardware, or a combination of two or more of these.

The kernel 131 controls or manages system resources (e.g., the bus 110, the processor 120, or the memory 130, etc.) used for executing an operation or a function implemented in the rest of the programming modules, for example, the middleware 132, the API 133, or the application 134. Also, the kernel 131 provides an interface for allowing the middleware 132, the API 133, or the application 134 to access an individual element of the electronic device 101 and control or manage the same.

The middleware 132 performs a mediation role so that the API 133 or the application 134 may communicate with the kernel 131 to provide and receive data. Also, in connection with task requests received from the application 134, the middleware 132 performs a control (e.g., scheduling or load balancing) for a task request using, for example, a method of assigning priority that may use a system resource (e.g., the bus 110, the processor 120, or the memory 130, etc.) of the electronic device 101 to at least one application 134.

The API 133 is an interface for allowing the application 134 to control a function provided by the kernel 131 or the middleware 132, and may include at least one interface or function (e.g., an instruction) for file control, window control, image processing, or character control, etc.

According to an embodiment of the present invention, the application 134 may include a Short Message Service/Multimedia Messaging Service (SMS/MMS) application, an e-mail application, a calendar application, an alarm application, a health care application (e.g., an application for measuring a quantity of motion or a blood sugar level, etc.), or an environmental information application (e.g., an application providing atmospheric pressure, humidity or temperature information, etc.). Additionally or alternatively, the application 134 may be an application related to information exchange between the electronic device 101 and an external electronic device (e.g., the electronic device 104). The application related to the information exchange may include, for example, a notification relay application for transferring certain information to the external electronic device or a device management application for managing the external electronic device.

For example, the notification relay application may include a function for transferring notification information generated from a different application (e.g., an SMS/MMS application, an e-mail application, a health care application, or an environmental information application) of the electronic device 101 to an external electronic device (e.g., the electronic device 104). Additionally or alternatively, the notification relay application may, for example, receive notification information from an external electronic device (e.g., the electronic device 104) and provide the same to a user. The device management application may manage (e.g., install, delete, or update) a function (e.g., turn-on/turn-off of an external electronic device itself (or some constituent part) or luminance (or resolution) control of a display) of an external electronic device (e.g., the electronic device 104) communicating with the electronic device 101 and an application operating in the external electronic device or a service (e.g., a communication service or a message service) provided by the external electronic device.

According to an embodiment of the present invention, the application 134 includes a designated application depending on an attribute (e.g., a kind of an electronic device) of the external electronic device (e.g., the electronic device 104). For example, in the case where the external electronic device is an MP3 player, the application 134 includes an application related to music reproduction. Similarly, in the case where the external electronic device is a mobile medical health care device, the application 134 includes an application related to health care. According to an embodiment of the present invention, the application 134 may include at least one of an application designated in the electronic device 101 and an application received from the external electronic device (e.g., the server 106 or the electronic device 104).

The I/O interface 140 transfers an instruction or data input from a user via an I/O unit (e.g., a sensor, a keyboard, or a touchscreen) to the processor 120, the memory 130, the communication interface 160, or the content reproducing module 170 via the bus 110, for example. For example, the I/O interface 140 may provide data regarding a user's touch input via the touchscreen to the processor 120. Also, the I/O interface 140 may, for example, output an instruction or data received via the bus 110 from the processor 120, the memory 130, and the communication interface 160, or the content reproducing module 170 via the I/O unit (e.g., a speaker or a display). For example, the I/O interface 140 may output voice data processed by the processor 120 to a user via a speaker.

The display 150 displays various types of information (e.g., multimedia data or text data, etc.) to a user.

The communication interface 160 establishes communication between the electronic device 101 and an external device (e.g., the electronic device 104 or the server 106). For example, the communication interface 160 may be connected to a network 162 via wireless communication or wired communication to communicate with the external device. The wireless communication may, for example, include at least one of Wireless Fidelity (Wi-Fi), Bluetooth (BT), Near Field Communication (NFC), a Global Positioning System (GPS), or cellular communication (e.g., Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), or Global System for Mobile communications (GSM), etc.). The wired communication may include, for example, at least one of a Universal Serial Bus (USB), a High Definition Multimedia Interface (HDMI), Recommended Standard 232 (RS-232), and Plain Old Telephone Service (POTS).

According to an embodiment of the present invention, the network 162 may be a telecommunications network. The telecommunications network may include at least one of a computer network, the Internet, an Internet of Things, and a telephone network. According to an embodiment of the present invention, a protocol (e.g., a transport layer protocol, a data link layer protocol, or a physical layer protocol) for communication between the electronic device 101 and an external device may be supported by at least one of the application 134, the application programming interface 133, the middleware 132, the kernel 131, or the communication interface 160.

According to an embodiment of the present invention, the server 106 supports driving of the electronic device 101 by performing at least one operation among the operations (or functions) implemented in the electronic device 101. For example, the server 106 may include a content reproducing server module 108 which can support the content reproducing module 170 implemented in the electronic device 101. For instance, the content reproducing server module 108 may include at least one constituent element of the content reproducing module 170, and perform (e.g., act for) at least one operation among the operations performed by the content reproducing module 170.

According to an embodiment of the present invention, the content reproducing module 170 provides an additional effect by controlling an operation of the electronic device 101 on the basis of an attribute of a content while reproducing the content. According to an embodiment of the present invention, the content is digital content that can be reproduced in the electronic device 101, and may include movies, music, games, e-books, webpages, or the like.

According to an embodiment of the present invention, the content reproducing module 170 provides the effect by controlling vibration, brightness, audio, or the like while reproducing the content on the basis of the content attribute. For example, in case of reproducing a content having an attribute of a dark atmosphere (e.g., a horror genre), a screen may be output with low/dark brightness on the basis of the attribute, and background audio corresponding to the dark atmosphere may be output, so that a user can experience a feeling of tension corresponding to the dark atmosphere.

According to an embodiment of the present invention, the content reproducing module 170 provides the effect by outputting reference information related to a context of the content. According to an embodiment of the present invention, the content reproducing module 170 acquires the reference information related to the context of the content from an internal or external element. According to an embodiment of the present invention, the content reproducing module 170 reproduces the content consisting of an image and a text, and acquires and outputs reference information related to a keyword through text analysis (or image analysis) for a reproduction duration of the current content. For example, the keyword may be a content producer, a name of a main character, a historical background, or the like, and the content reproducing module 170 may acquire the reference information related to the keyword and output it to a part of a content reproduction screen. According to an embodiment of the present invention, the reference information may include a web search result based on the keyword.

According to an embodiment of the present invention, the content reproducing module 170 recognizes an attribute at a time of reproducing the content or while the content is reproduced. For example, the recognition of the attribute while the content is reproduced may be an operation of recognizing an attribute of a changed duration whenever each duration is changed as to a content consisting of a plurality of durations (e.g., a frame or the like). For example, an attribute for a changed frame may be recognized.

Additional information for the content reproducing module 170 is provided with reference to FIGS. 2 to 10 described below.

Figure 2:
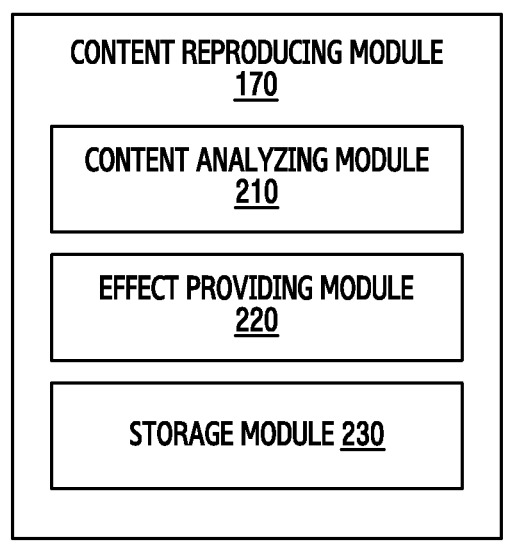
FIG. 2 is a block diagram of a content reproducing module according to an embodiment of the present invention.

FIG. 2 is a block diagram of the content reproducing module 170 according to an embodiment of the present invention.

Referring to FIG. 2, the content reproducing module 170 includes a content analyzing module 210, an effect providing module 220, and a storage module 230.

The content analyzing module 210 recognizes an attribute for a content to be reproduced. According to an embodiment of the present invention, the attribute of the content may include information regarding a genre of the content, a storyline of the content, a historical background of a context of the content, a main character related to the context of the content, or the like.

According to an embodiment of the present invention, the content analyzing module 210 recognizes the attribute of the content by analyzing additional information related to the content, for example, meta information, preview information, content evaluation information (e.g., a viewer comment), or the like. According to an embodiment of the present invention, the content analyzing module 210 acquires the additional information included in the content, or acquires the additional information through an additional device (e.g., a content server, another electronic device, etc.) for managing the additional information.

According to an embodiment of the present invention, the content analyzing module 210 recognizes the attribute of the content through text analysis, image analysis, or the like. According to an embodiment of the present invention, the content analyzing module 210 recognizes the attribute by considering a priority for a text or an image. For example, the content analyzing module 210 may confirm the priority on the basis of a size of the image or text, the number of repetitions, or the like, and may recognize the attribute of the content by using the text or image having a priority.

According to an embodiment of the present invention, the content analyzing module 210 receives attribute information regarding the content to be reproduced through another electronic device or a server related to the content.

The effect providing module 220 provides an additional effect while the content is reproduced on the basis of the attribute of the content to be reproduced.

According to an embodiment of the present invention, the effect providing module 220 provides the additional effect by controlling an operation of the electronic device 101 in association with the attribute. According to an embodiment of the present invention, the additional effect may be a certain effect provided by the electronic device 101 (or through the electronic device 101) independent of the reproducing of the content. For example, the providing of the certain effect may be an operation of additionally providing screen brightness, vibration, audio, or the like in association with the attribute of the content. In addition, the providing of the certain effect may be an operation of performing a function of the electronic device 101 in association with the attribute of the content.

According to an embodiment of the present invention, the effect providing module 220 provides reference information in association with the attribute of the content. According to an embodiment of the present invention, the reference information may be a search result obtained by using the attribute of the content, for example, a web search resource, and may be output to a part of a content reproduction screen. According to an embodiment of the present invention, the reference information is acquired by the effect providing module 220, and is also acquired by another electronic device or a server or the like. For example, the effect providing module 220 may acquire a web search result for explaining a historical background for a context of the content to be reproduced, an image related to a main character of the context of the content, or the like, and may use the acquired information as the reference information.

According to an embodiment of the present invention, the effect providing module 220 generates an effect in association with a pre-set content reproduction duration. For example, a content consisting of a plurality of durations (e.g., a frame, etc.) is reproduced, and the effect providing module 220 acquires an effect for a duration in which the content is currently being reproduced. As another example, the effect providing module 220 acquires an effect for each duration before the content is reproduced, and generates an effect for the entire duration of the content by combining the respective effects into one.

The storage module 230 stores at least one content. The content stored in the storage module 230 may be generated by the electronic device 101, or received from another electronic device or a server. According to an embodiment of the present invention, the storage module 230 stores additional information regarding at least one stored content. According to an embodiment of the present invention, the storage module 230 stores effects associated with attributes of various contents.

According to an embodiment of the present invention, the electronic device 101 includes a memory for storing at least one content, and a processor 120 configured to recognize an attribute of the content and to control an operation of the electronic device 101 on the basis of attribute information while the content is reproduced.

According to an embodiment of the present invention, the processor 120 is configured to control at least one of vibration, audio, and display according to the attribute of the content.

According to an embodiment of the present invention, the processor 120 is configured to output a search result for the attribute of the content to a part of a content reproducing screen.

According to an embodiment of the present invention, the processor 120 is configured to control an operation of a neighboring electronic device connected to the electronic device 101 on the basis of the attribute information while the content is reproduced.

According to an embodiment of the present invention, the processor 120 is configured to be connected to a different electronic device and to receive attribute information of the content from the connected different electronic device.

According to an embodiment of the present invention, the processor 120 is configured to recognize an attribute corresponding to each frame of the content.

According to an embodiment of the present invention, the processor 120 is configured to acquire audio corresponding to the attribute of the content and to output the audio as background audio for a content reproducing screen.

According to an embodiment of the present invention, the processor 120 is configured to acquire video corresponding to the attribute of the content and to output the video to a part of a content reproducing screen.

According to an embodiment of the present invention, the processor 120 is configured to output a content reproducing screen with a display brightness corresponding to the attribute of the content.

Figure 3:
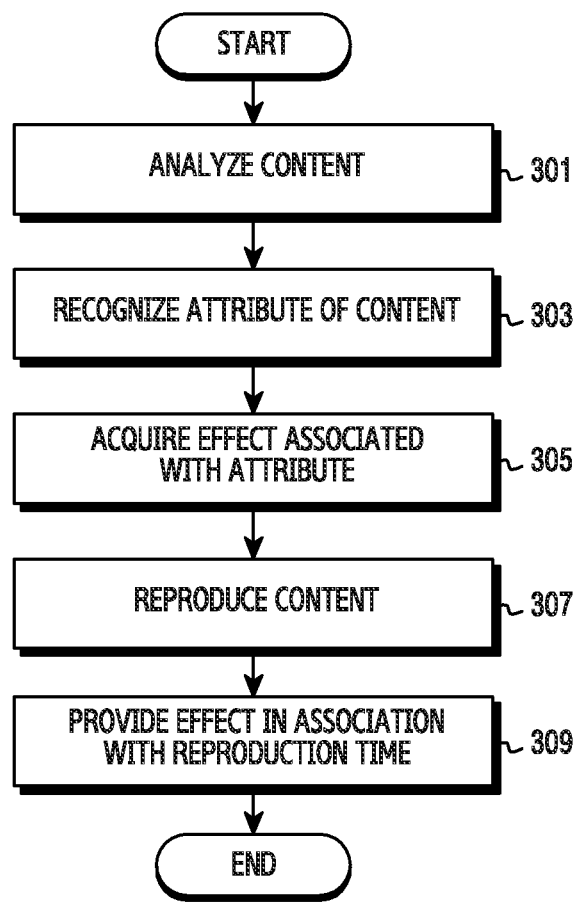
FIG. 3 is a flowchart of a content reproducing method of an electronic device according to an embodiment of the present invention.

FIG. 3 is a flowchart of a content reproducing method of an electronic device 101 according to an embodiment of the present invention.

According to an embodiment of the present invention, before a content is reproduced, the electronic device 101 pre-acquires an effect for the content to be reproduced and stores the effect.

In step 301, the electronic device 101 analyzes the content to be reproduced. According to an embodiment of the present invention, the step 301 of analyzing the content may be a step of acquiring information used to recognize an attribute of the content. According to an embodiment of the present invention, the electronic device 101 acquires the information from an internal or external element. For example, the electronic device 101 may acquire information stored in an internal storage medium or from a server, and thus may use the information to recognize the attribute of the content.

According to an embodiment of the present invention, in order to recognize the attribute of the content, the electronic device 101 acquires additional information related to the selected content (e.g., the content to be reproduced). According to an embodiment of the present invention, the additional information may include meta information, preview information, content evaluation information (e.g., a viewer comment), or the like.

According to an embodiment of the present invention, the electronic device 101 performs a step of analyzing a context of the content to recognize the attribute of the content. According to an embodiment of the present invention, the electronic device 101 performs a step of text analysis, image analysis, or the like for the content.

In step 303, the electronic device 101 recognizes the attribute of the content. According to an embodiment of the present invention, the electronic device 101 recognizes information regarding a genre of the content, a storyline of the content, a historical background of a context of the content, a main character related to the context of the content, or the like, as the attribute on the basis of a content analysis result.

In step 305, the electronic device 101 acquires an effect associated with the attribute of the content. According to an embodiment of the present invention, the effect associated with the attribute may be an effect which is provided to add an interest in the content or to help understanding of the content. Such an effect may be provided when the electronic device 101 controls an operation of the electronic device 101 on the basis of the attribute, instead of being provided through the content itself.

Figure 6:
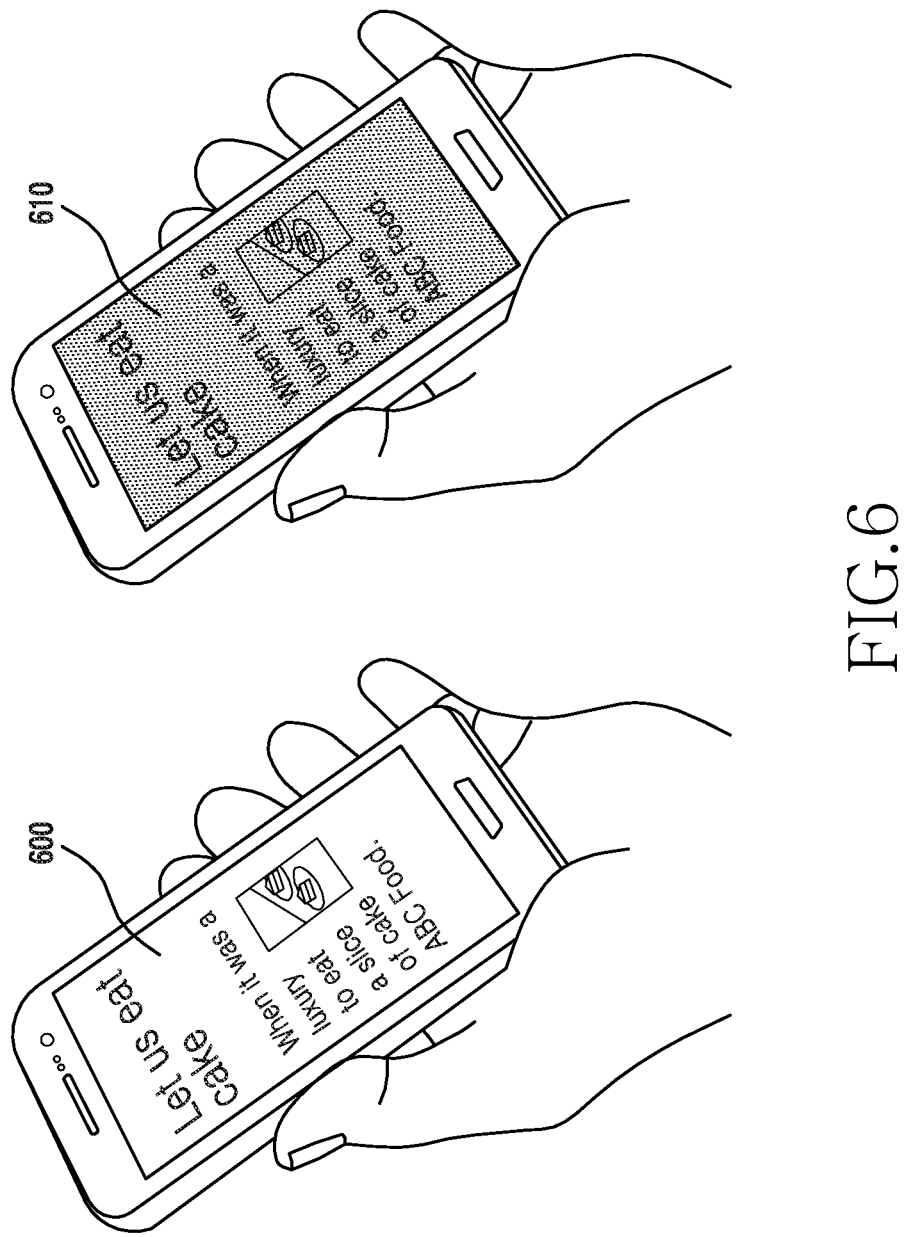
FIG. 6 illustrates a content reproducing screen of an electronic device according to an embodiment of the present invention.
Figure 7:
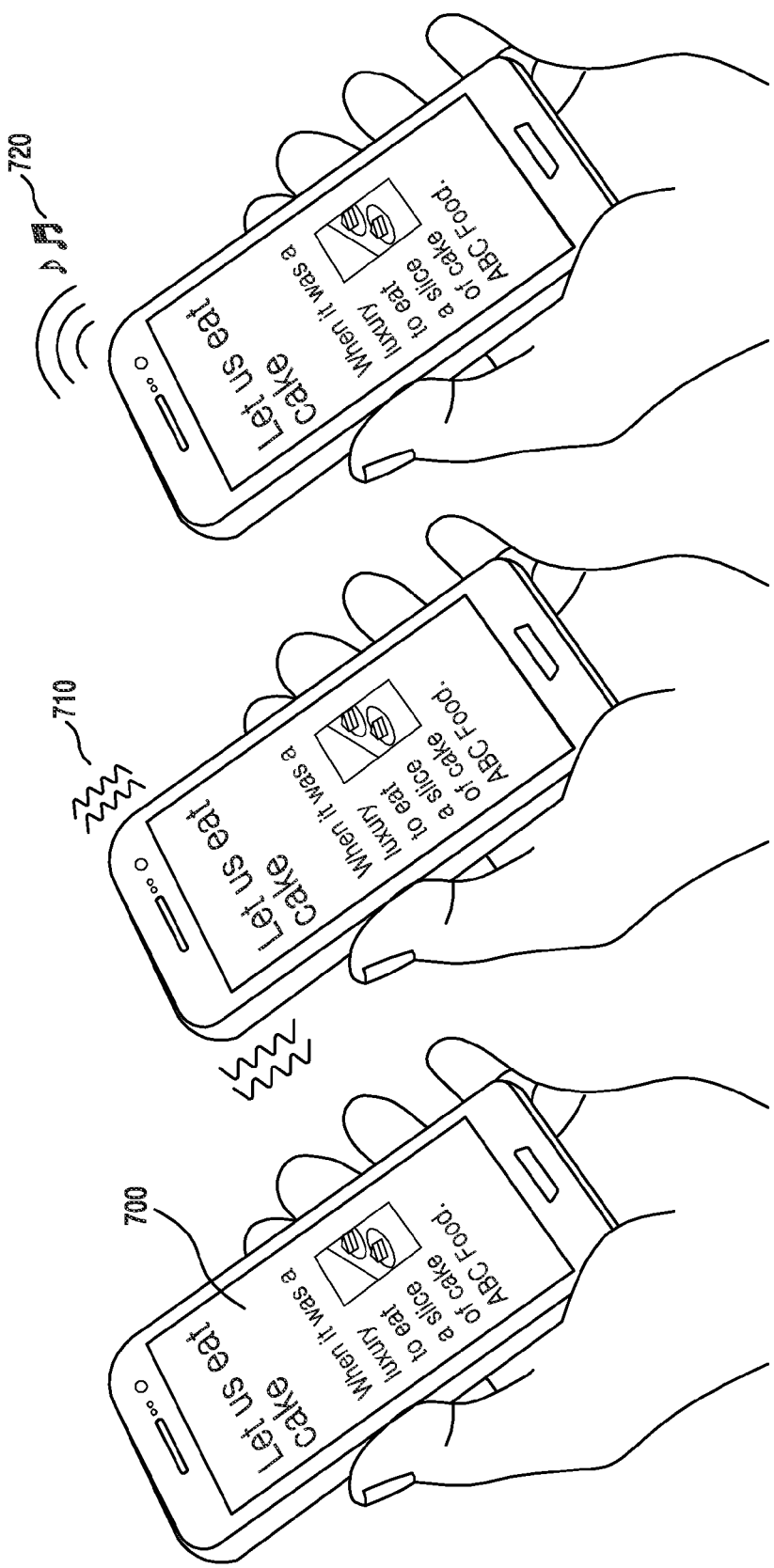
FIG. 7 illustrates a content reproducing screen of an electronic device according to an embodiment of the present invention.

According to an embodiment of the present invention, the electronic device 101 provides the effect by controlling screen brightness, audio, vibration, or the like. For example, the attribute of the content may be a genre of the content, and, as shown in FIG. 6, the electronic device 101 provides the effect by adjusting the screen brightness so that a user can feel an atmosphere associated with the genre of the selected content. As another example, as shown in FIG. 7, the electronic device 101 provides an effect associated with the generation of at least one of vibration and audio.

Figure 8:
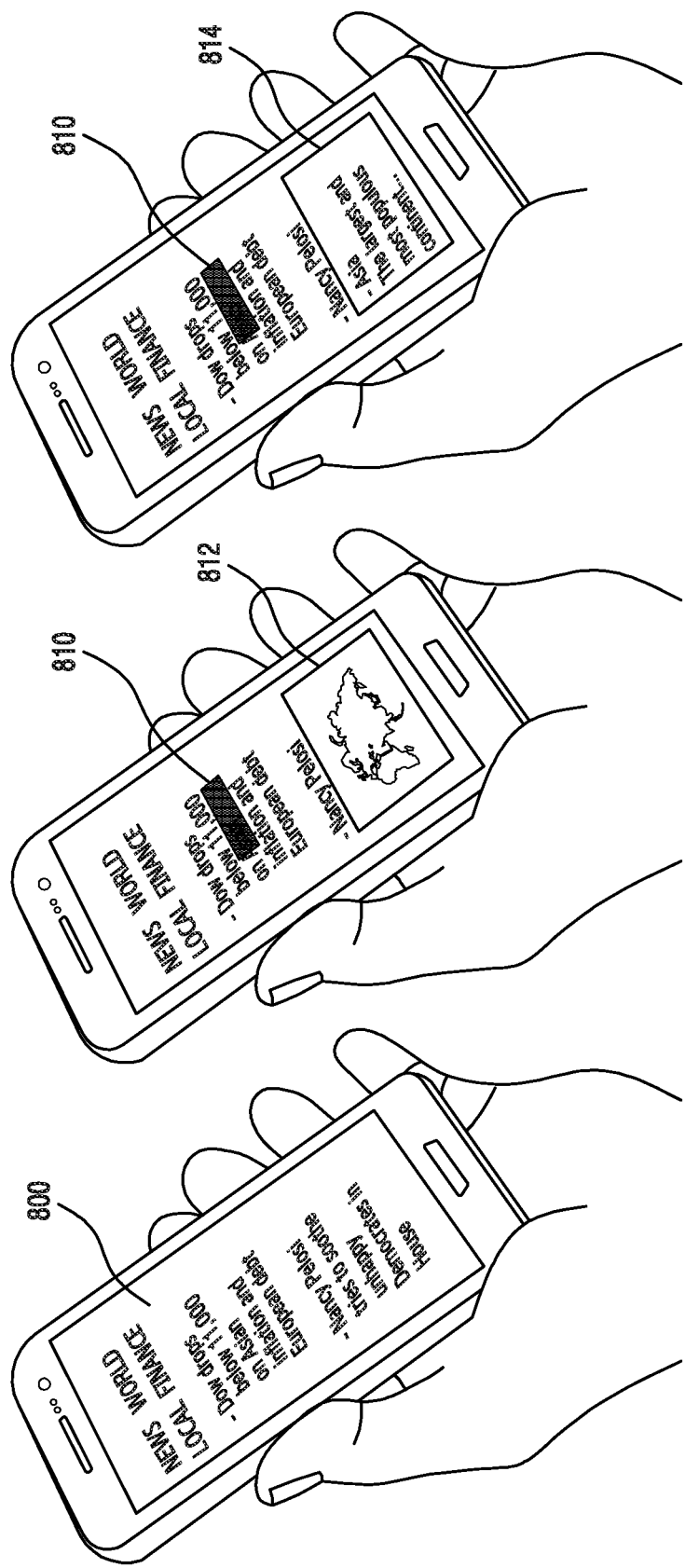
FIG. 8 illustrates a content reproducing screen of an electronic device according to an embodiment of the present invention.

According to an embodiment of the present invention, the electronic device 101 provides the effect by outputting reference information configured with an image, a text, or the like. For example, the attribute of the content may be a keyword of a context of the content, and as shown in FIG. 8, the electronic device 101 acquires image information or text information for explaining the keyword and uses the information as the effect.

Figure 9:
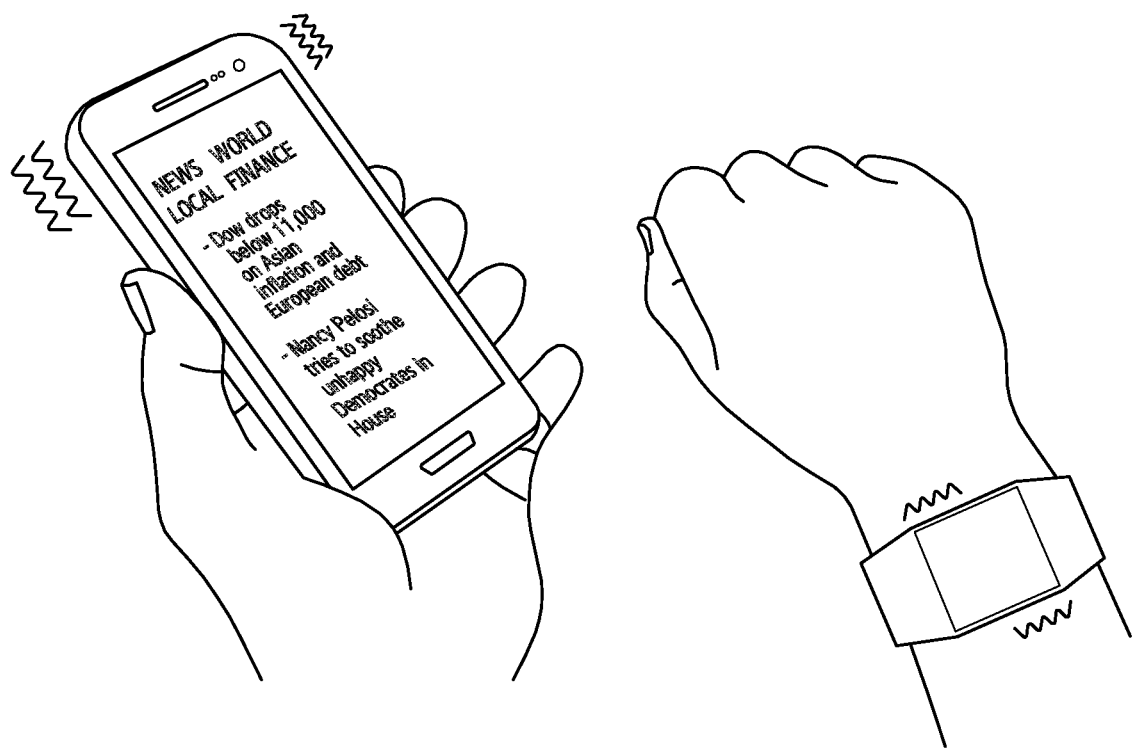
FIG. 9 illustrates a content reproducing screen of an electronic device according to an embodiment of the present invention.

According to an embodiment of the present invention, the electronic device 101 acquires the effect on the basis of a configuration state of the electronic device 101. For example, the configuration state of the electronic device includes a sound configuration. As shown in FIG. 9, in a state where the electronic device 101 maintains a silent mode, an effect (e.g., vibration effect) other than an audio output is acquired. As another example, the configuration state of the electronic device includes a communicate configuration. As shown in FIG. 9, in a state where the electronic device 101 is connected to a neighboring electronic device, e.g., a Bluetooth accessory, an effect outputs to neighboring devices is acquired. According to an embodiment of the present invention, as shown in FIG. 9, in a state where the electronic device 101 is connected to a neighboring electronic device, an effect of simultaneous outputs to neighboring devices is acquired.

In step 307, the electronic device 101 reproduces a content in association with an input. According to an embodiment of the present invention, the electronic device 101 outputs an e-book content through a pre-defined browser in association with an input which requests an output of the e-book content.

In step 309, the electronic device 101 provides an effect in association with the content reproducing time. According to an embodiment of the present invention, when a duration of a content of which an attribute has been recognized is confirmed while reproducing the content, the electronic device 101 provides the effect by controlling an operation of the electronic device 101 while reproducing the content.

According to an embodiment of the present invention, the electronic device 101 provides an effect in association with a detection of a pre-defined input while reproducing the content. For example, the electronic device 101 may provide an effect associated with an attribute at a time of detecting an input for a scroll, a page change, or the like.

According to an embodiment of the present invention, the electronic device 101 is connected to a neighboring electronic device, the electronic device 101 provides the effect to the neighboring devices.

Figure 4:
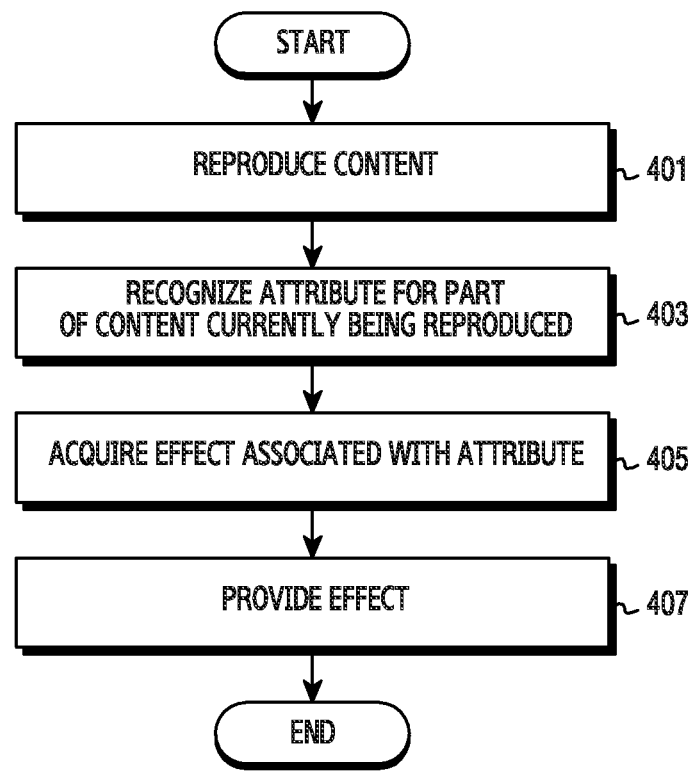
FIG. 4 is a flowchart of a content reproducing method of an electronic device according to an embodiment of the present invention.

FIG. 4 is a flowchart of a content reproducing method of an electronic device 101 according to an embodiment of the present invention.

According to an embodiment of the present invention, the electronic device 101 acquires an effect for a content while the content is reproduced.

In step 401, the electronic device 101 reproduces the content acquired from an internal or external element in response to an input. According to an embodiment of the present invention, the input for reproducing the content may include a direct touch input, an indirect touch input, a key input, a gesture input, a button input, a voice input, or the like.

In step 403, the electronic device 101 recognizes an attribute for a duration of the content currently being reproduced. According to an embodiment of the present invention, the content may consist of at least one duration. For example, the duration may be each frame of the content.

In step 405, the electronic device 101 acquires an effect associated with an attribute corresponding to the duration of the content currently being reproduced.

In step 407, the electronic device 101 provides an effect associated with a reproduction duration of the content.

Figure 5:
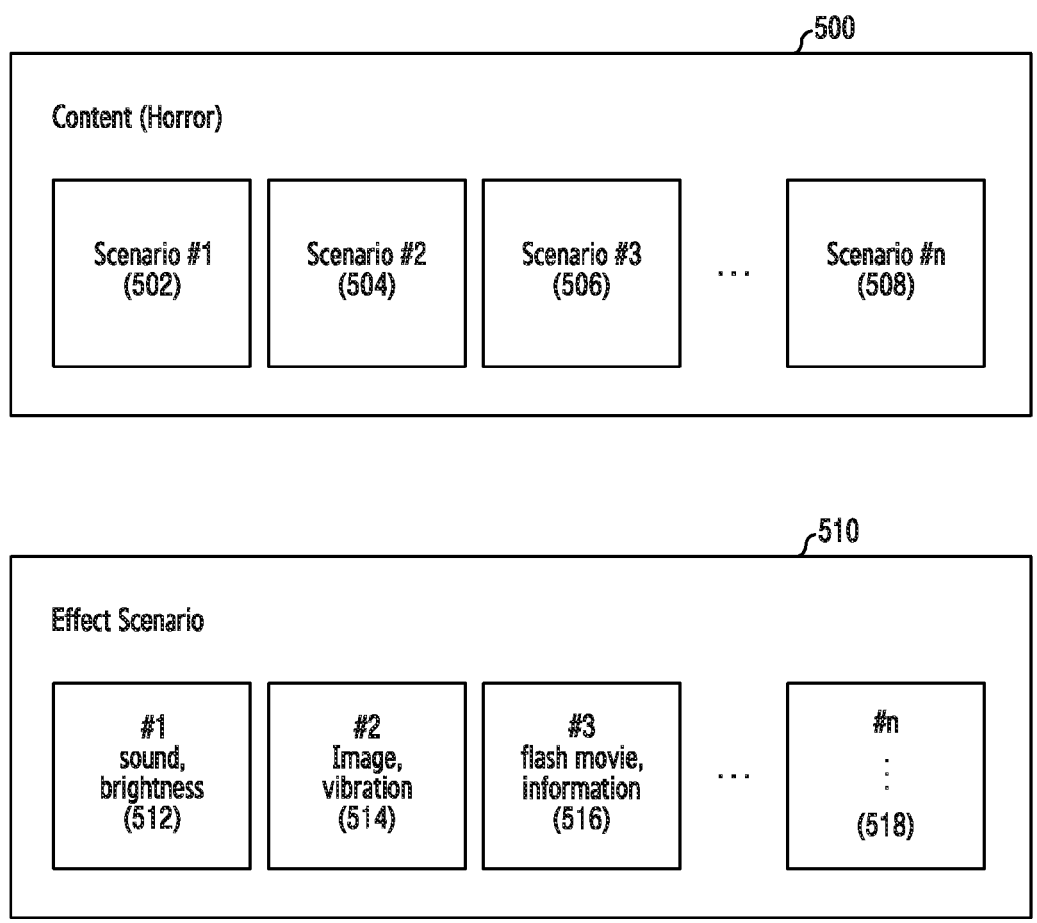
FIG. 5 illustrates an effect generated in an electronic device according to an embodiment of the present invention.

FIG. 5 illustrates an effect generated in an electronic device 101 according to an embodiment of the present invention.

According to an embodiment of the present invention, the electronic device 101 reproduces various types of a content, and additionally controls an operation of the electronic device 101 on the basis of an attribute of the content while the content is reproduced, thereby being able to provide an effect for the content.

According to an embodiment of the present invention, such a content may consist of a plurality of frames. According to an embodiment of the present invention, the frame may be a page.

The electronic device 101 may recognize an attribute for the content, and thereafter may acquire an effect for the attribute. According to an embodiment of the present invention, the electronic device 101 recognizes the attribute for each frame of the content. For example, the electronic device 101 may recognize the attribute for each frame by using additional information such as meta information. As another example, the electronic device 101 recognizes the attribute for each frame by performing image or text analysis with respect to each frame.

According to an embodiment of the present invention, a content 500 is an e-book corresponding to a horror genre. The electronic device 101 may define an effect 510 in association with each of frames 502, 504, 506, and 508 so that an environment in which the content 500 is reproduced creates an atmosphere of horror.

According to an embodiment of the present invention, the electronic device 101 controls an operation of the electronic device 101 in accordance with an attribute, thereby being able to provide an effect for the environment in which the content is reproduced.

For example, the electronic device 101 may define an effect 512 for adjusting audio and screen brightness with respect to frame 502 corresponding to scenario 1. For example, the electronic device 101 may output an audio suitable for the atmosphere of horror at a time of reproducing frame 502 corresponding to scenario 1, and may cause the brightness of the screen to gradually darken.

As another example, the electronic device 101 may define an effect 514 for outputting an image and generating a vibration with respect to frame 504 corresponding to scenario 2. For example, the electronic device 101 may output an image capable of creating an atmosphere of horror at a part of the content reproducing screen, and may control a vibration (i.e., strength, frequency of use, duration).

As another example, the electronic device 101 may define an effect 516 for outputting a flash movie and reference information with respect to frame 506 corresponding to scenario 3. For example, the electronic device 101 may output the flash movie and reference information, e.g., information on a genre description and a content rating, to create an atmosphere of horror at a part of the content reproducing screen.

The electronic device 101 may also define an effect 518 for frame 508 corresponding to a scenario n on the basis of the aforementioned method.

FIG. 6 illustrates a content reproducing screen of an electronic device 101 according to an embodiment of the present invention.

According to an embodiment of the present invention, the electronic device 101 recognizes a content to be reproduced or an attribute of the content currently being reproduced. According to an embodiment of the present invention, the electronic device 101 controls an operation of the electronic device 101 to generate an effect associated with the attribute while a content 600 is reproduced.

According to an embodiment of the present invention, the electronic device 101 allows the content to be reproduced in a state where the brightness of the screen corresponding to the attribute of the content 600 is controlled (see 610).

For example, the effect may be associated with a reproduction environment of the content, and the electronic device 101 may adjust the brightness of a content reproduction screen to create a content reproduction environment corresponding to the attribute of the content.

FIG. 7 illustrates a content reproducing screen of an electronic device 101 according to an embodiment of the present invention.

According to an embodiment of the present invention, the electronic device 101 recognizes a content to be reproduced or an attribute of the content currently being reproduced. According to an embodiment of the present invention, the electronic device 101 generates an effect associated with the attribute while a content 700 is reproduced.

According to an embodiment of the present invention, the electronic device generates a vibration 710 or outputs background audio 720 associated with the attribute to create a content reproduction environment associated with the attribute of the content.

FIG. 8 illustrates a content reproducing screen of an electronic device 101 according to an embodiment of the present invention.

According to an embodiment of the present invention, the electronic device 101 recognizes a content to be reproduced or an attribute of the content currently being reproduced. According to an embodiment of the present invention, the electronic device 101 generates an effect associated with the attribute while a content 800 is reproduced.

According to an embodiment of the present invention, the electronic device 101 outputs reference information for the content.

According to an embodiment of the present invention, the electronic device 101 analyzes a keyword 810 by using the attribute of the content, and outputs an image 812 or text information 814 for explaining the analyzed keyword. For example, as illustrated in FIG. 8, the electronic device 101 identifies a keyword of "Asian" from a content reproduction screen, and acquires and outputs an image corresponding to the keyword or a web search result corresponding to the keyword.

FIG. 9 illustrates a content reproducing screen of an electronic device 101 according to an embodiment of the present invention.

According to an embodiment of the present invention, the electronic device 101 recognizes a content to be reproduced or an attribute of the content currently being reproduced. According to an embodiment of the present invention, the electronic device 101 generates an effect associated with the attribute while a content is reproduced.

According to an embodiment of the present invention, the electronic device 101 acquires the effect on the basis of a configuration state of the electronic device 101. For example, in a state where the electronic device 101 maintains a silent mode, an effect other than an audio output is acquired. As another example, in a state where the electronic device 101 is connected to a neighboring electronic device, e.g., a Bluetooth accessory, an effect of simultaneous outputs to neighboring devices is acquired.

According to an embodiment of the present invention, a method of operating an electronic device 101 includes recognizing an attribute of a content to be reproduced, acquiring effect information corresponding to the attribute of the content, and applying the acquired effect to a reproducing screen of the content.

According to an embodiment of the present invention, applying the effect includes controlling at least one of a screen, vibration, and audio of the electronic device 101 for outputting the reproducing screen of the content.

According to an embodiment of the present invention, recognizing the attribute includes acquiring additional information of the content from an internal or external element of the electronic device 101, and acquiring an attribute associated with a pre-stored effect on the basis of the acquired additional information.

According to an embodiment of the present invention, acquiring the effect information includes acquiring effect information on the basis of a state of the electronic device 101. According to an embodiment of the present invention, the state of the electronic device 101 includes at least one of a configuration state and a connection state with respect to an external device.

According to an embodiment of the present invention, acquiring the effect information includes performing a search function by using the attribute of the content as a search word.

According to an embodiment of the present invention, recognizing the attribute includes analyzing a text or an image with respect to the content.

Figure 10:
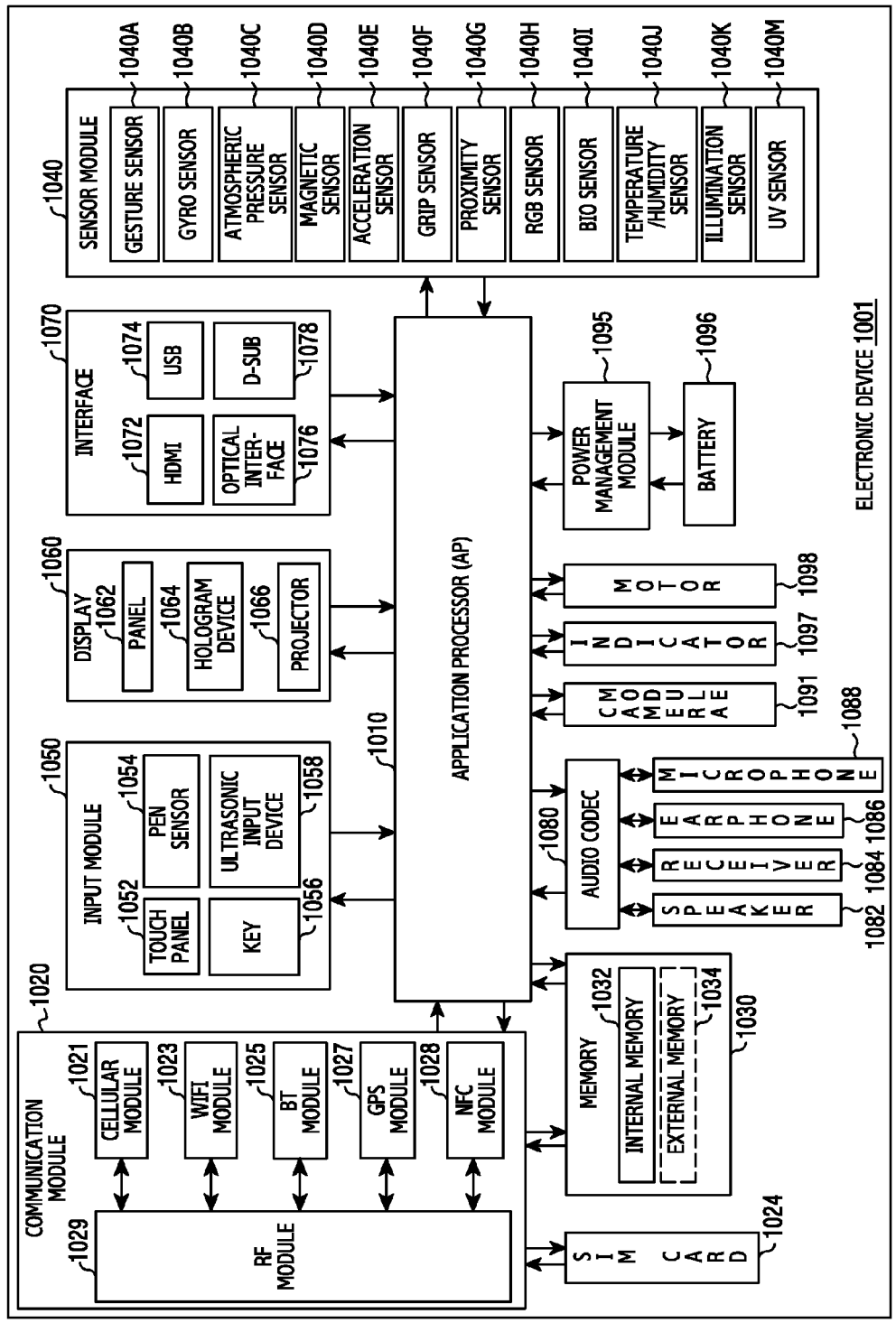
FIG. 10 is a block diagram of an electronic device according to an embodiment of the present invention.

FIG. 10 is a block diagram of an electronic device 1001 according to an embodiment of the present invention. The electronic device 1001 may include, for example, all or a portion of the electronic device 101 illustrated in FIG. 1.

Referring to FIG. 10, the electronic device 1001 includes one or more Application Processors (AP) 1010, a communication module 1020, a Subscriber Identification Module (SIM) card 1024, a memory 1030, a sensor module 1040, an input module 1050, a display 1060, an interface 1070, an audio COmpressor/DECompressor (CODEC) 1080, a camera module 1091, a power management module 1095, a battery 1096, an indicator 1097, or a motor 1098.

The AP 1010 drives an Operating System (OS) or an application to control a plurality of hardware or software elements connected to the AP 1010, and performs various data processes including multimedia data and operations. The AP 1010 may be implemented, for example, as a System on Chip (SoC). According to an embodiment of the present invention, the AP 1010 may further include a Graphics Processing Unit (GPU).

The communication module 1020 (e.g., the communication interface 160) performs data transmission/reception in communication between the electronic device 1001 (e.g., the electronic device 101) and other electronic devices (e.g., the electronic device 104 or the server 106) connected via a network. According to an embodiment of the present invention, the communication module 1020 includes a cellular module 1021, a Wi-Fi module 1023, a BT module 1025, a GPS module 1027, an NFC module 1028, and a Radio Frequency (RF) module 1029.

The cellular module 1021 provides voice communication, image communication, a Short Message Service (SMS), or an Internet service, etc. via a communication network (e.g., LTE, LTE-A, CDMA, WCDMA, UMTS, WiBro, or GSM, etc.). Also, the cellular module 1021 may perform discrimination and authentication of an electronic device within a communication network using, for example, a SIM card 1024. According to an embodiment of the present invention, the cellular module 1021 performs at least a portion of the functions that are provided by the AP 1010. For example, the cellular module 1021 may perform at least a portion of a multimedia control function.

According to an embodiment of the present invention, the cellular module 1021 includes a Communication Processor (CP). Also, the cellular module 1021 may be, for example, implemented as an SoC. Though elements such as the cellular module 1021 (e.g., a communication processor), the memory 1030, or the power management module 1095, etc. are illustrated as separate from the AP 1010 in FIG. 10, according to an embodiment of the present invention, the AP 1010 may be implemented to include at least a portion (e.g., the cellular module 1021) of the above-described elements.

According to an embodiment of the present invention, the AP 1010 or the cellular module 1021 (e.g., a communication processor) loads an instruction or data received from at least one of a non-volatile memory and other elements connected thereto onto a volatile memory, and processes the same. Also, the AP 1010 or the cellular module 1021 may store data received from at least one of the other elements or generated by at least one of the other elements in a non-volatile memory.

Each of the Wi-Fi module 1023, the BT module 1025, the GPS module 1027, or the NFC module 1028 may include, for example, a processor for processing data transmitted/received via a relevant module. Though the cellular module 1021, the Wi-Fi module 1023, the BT module 1025, the GPS module 1027, or the NFC module 1028 are illustrated as separate blocks in FIG. 10, according to an embodiment of the present invention, at least a portion (e.g., two or more elements) of the cellular module 1021, the Wi-Fi module 1023, the BT module 1025, the GPS module 1027, or the NFC module 1028 may be included in one Integrated Circuit (IC) or an IC package. For example, at least a portion (e.g., a communication processor corresponding to the cellular module 1021 and a Wi-Fi processor corresponding to the Wi-Fi module 1023) of processors corresponding to each of the cellular module 1021, the Wi-Fi module 1023, the BT module 1025, the GPS module 1027, or the NFC module 1028 may be implemented as one SoC.

The RF module 1029 performs transmission/reception of data, for example, transmission/reception of an RF signal. The RF module 1029 may include, for example, a transceiver, a Power Amplifier Module (PAM), a frequency filter, or a Low Noise Amplifier (LNA), etc. Also, the RF module 1029 may further include a part for transmitting/receiving an electromagnetic wave in free space by wireless communication, for example, a conductor or a conductive line, etc. Though FIG. 10 illustrates the cellular module 1021, the Wi-Fi module 1023, the BT module 1025, the GPS module 1027, and the NFC module 1028 as sharing one RF module 1029, according to an embodiment of the present invention, at least one of the cellular module 1021, the Wi-Fi module 1023, the BT module 1025, the GPS module 1027, or the NFC module 1028 may perform transmission/reception of an RF signal via a separate RF module.

The SIM card 1024 is inserted into a slot formed in a certain location in the electronic device 1001. The SIM card 1024 includes unique identification information (e.g., an Integrated Circuit Card IDentifier (ICCID)) or subscriber information (e.g., an International Mobile Subscriber Identity (IMSI)).

The memory 1030 (e.g., the memory 130) may include an internal memory 1032 or an external memory 1034. The internal memory 1032 may include, for example, at least one of a volatile memory (e.g., Dynamic Random Access Memory (DRAM), Static RAM (SRAM), Synchronous DRAM (SDRAM)) and a non-volatile memory (e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, etc.).

According to an embodiment of the present invention, the internal memory 1032 may be a Solid State Drive (SSD). The external memory 1034 may further include a flash drive, for example, a Compact Flash (CF) drive, a Secure Digital (SD) memory card, a Micro SD (Micro-SD) memory card, a Mini SD (Mini-SD) memory card, an extreme Digital (xD) memory card, or a memory stick. The external memory 1034 may be functionally connected to the electronic device 1001 via various interfaces. According to an embodiment of the present invention, the electronic device 1001 may further include a storage device (or a storage medium) such as a hard drive.

The sensor module 1040 measures a physical quantity or detects an operation state of the electronic device 1001, and converts the measured or detected information to an electrical signal. The sensor module 1040 may include, for example, at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (e.g., a Red Blue Green (RGB) sensor), a biological (or bio) sensor 1040I, a temperature/humidity sensor 1040J, an illuminance sensor 1040K, or an Ultra Violet (UV) sensor 1040M. Additionally or alternatively, the sensor module 1040 may include, for example, an Electronic nose (E-nose) sensor, an ElectroMyoGraphy (EMG) sensor, an ElectroEncephaloGram (EEG) sensor, an ElectroCardioGram (ECG) sensor, an InfraRed (IR) sensor, an iris sensor, or a fingerprint sensor, etc. The sensor module 1040 may further include a control circuit for controlling at least one sensor belonging thereto.

The input module 1050 may include a touch panel 1052, a (digital) pen sensor 1054, a key 1056, or an ultrasonic input device 1058. The touch panel 1052 recognizes a touch input using at least one of a capacitive, a resistive, an infrared, or an ultrasonic method. Also, the touch panel 1052 may further include a control circuit. A capacitive touch panel performs detection by a physical contact or proximity recognition. The touch panel 1052 may further include a tactile layer. In this case, the touch panel 1052 provides a tactile reaction to a user.

The (digital) pen sensor 1054 may be implemented using, for example, a method which is the same as or similar to receiving a user's touch input, or using a separate sheet for detection. The key 1056 may include, for example, a physical button, an optical key or a keypad. The ultrasonic input device 1058 is a device for recognizing data by detecting a sound wave using a microphone (e.g., a microphone 1088) in the electronic device 1001 via an input device generating an ultrasonic signal, and enables wireless recognition. According to an embodiment of the present invention, the electronic device 1001 receives a user input from an external device (e.g., a computer or a server) connected to the communication module 1020 using the communication module 1020.

The display 1060 (e.g., the display 150) may include a panel 1062, a hologram device 1064, or a projector 1066. The panel 1062 may be, for example, a Liquid Crystal Display (LCD), or an Active-Matrix Organic Light-Emitting Diode (AM-OLED), etc. The panel 1062 may be implemented, for example, such that it is flexible, transparent, or wearable. The panel 1062 may be configured as one module together with the touch panel 1052. The hologram device 1064 displays a three-dimensional image in the air using the interference of light. The projector 1066 projects light onto a screen to display an image. The screen may be positioned, for example, internal or external to the electronic device

1001. According to an embodiment of the present invention, the display 1060 may further include a control circuit for controlling the panel 1062, the hologram device 1064, or the projector 1066.

The interface 1070 may include, for example, a High-Definition Multimedia Interface (HDMI) 1072, a Universal Serial Bus (USB) 1074, an optical interface 1076, or a D-subminiature (D-sub) connector 1078. The interface 1070 may be included, for example, in the communication interface 160 illustrated in FIG. 1. Additionally or alternatively, the interface 1070 may include, for example, a mobile high-definition link (MHL) interface, a secure digital (SD) card/multi-media card (MMC) interface, or an infrared data association (IrDA) standard interface.

The audio CODEC 1080 converts a sound to an electrical signal and vice versa. At least a partial element of the audio CODEC 1080 may be included, for example, in the I/O interface 140 illustrated in FIG. 1. The audio CODEC 1080 may process sound information input or output via, for example, a speaker 1082, a receiver 1084, an earphone 1086, or a microphone 1088, etc.

The camera module 1091 is a device that may shoot a still image and a moving picture. According to an embodiment of the present invention, the camera module 1091 may include one or more image sensors (e.g., a front sensor or a rear sensor), a lens, an Image Signal Processor (ISP), or a flash (e.g., a Light-Emitting Diode or xenon lamp).

The power management module 1095 manages power of the electronic device 1001. The power management module 1095 may include, for example, a Power Management Integrated Circuit (PMIC), a charger IC, a battery or a battery gauge.

The PMIC may be mounted, for example, inside an integrated circuit or an SoC semiconductor. A charging method may be classified into a wired charging method and a wireless charging method. The charging IC may charge a battery and prevent introduction of an overvoltage or an overcurrent from a charger. According to an embodiment of the present invention, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge measures, for example, a remnant of the power of the battery 1096, a voltage, a current, or a temperature while charging. The battery 1096 stores or generates electrical power, and supplies electrical power to the electronic device 1001 using the stored or generated electrical power. The battery 1096 may include, for example, a rechargeable battery or a solar battery.

The indicator 1097 displays a certain state of the electronic device 1001 or a portion thereof (e.g., the AP 1010), for example, a booting state, a message state, or a charging state, etc. The motor 1098 converts an electrical signal to a mechanical vibration. The electronic device 1001 may include a processor (e.g., a GPU) for supporting a mobile TV. The processor for supporting the mobile TV may process media data corresponding to standards, for example, such as Digital Multimedia Broadcasting (DMB), Digital Video Broadcasting (DVB), or a medias flow, etc.

Each of the above-described elements of the electronic device 1001 according to the present invention may be configured using one or more components, and a name of a relevant element may change depending on a kind of the electronic device 1001. An electronic device 1001 according to the present invention may include at least one of the above-described elements, and a portion of the elements may be omitted, or additional other elements may be further included. Also, a portion of the elements of the electronic device 1001 according to the present invention may be combined to form one entity and equally perform a function of the relevant elements before the combination.

The term "module" used in the present disclosure may refer to, for example, a unit including a combination of one or more hardware, software, or firmware. The term "module" may be interchangeably used with a term such as "unit," "logic," "logical block," "component," or "circuit," etc. The term "module" may refer to a minimum unit of an integrally configured part or a portion thereof. The term "module" may refer to a minimum unit performing one or more functions or a portion thereof. The term "module" may refer to a device that is mechanically or electronically implemented. For example, a "module" according to the present invention may include at least one of an Application-Specific Integrated Circuit (ASIC) chip, a Field-Programmable Gate Array (FPGA), or a programmable-logic device which are known, or will be developed in the future, and performing certain operations.

According to an embodiment of the present invention, at least a portion of an apparatus (e.g., modules or functions thereof) or a method (e.g., steps) according to the present invention may be implemented as an instruction stored in a non-transitory computer-readable storage media, for example, in the form of a programming module. An instruction, when executed by one or more processors (e.g., the processor 120), may allow the one or more processors to perform a function corresponding to the instruction. The non-transitory computer-readable storage media may be, for example, the memory 130. At least a portion of a programming module may be implemented (e.g., executed) by, for example, the processor 120. At least a portion of the programming module may include, for example, a module, a program, a routine, sets of instructions, or a process, etc. for performing one or more functions.

The non-transitory computer-readable storage media may include a hard disk, a magnetic media such as a floppy disk and a magnetic tape, a Compact Disc Read Only Memory (CD-ROM), optical media such as a Digital Versatile Disc (DVD), magneto-optical media such as a floptical disk, and a hardware device configured for storing and performing a program instruction (e.g., a programming module) such as a Read Only Memory (ROM), a Random Access Memory (RAM), a flash memory, etc. Also, the program instruction may include not only a machine language code generated by a compiler but also a high-level language code executable by a computer using an interpreter, etc. The above-described hardware device may be configured to operate as one or more software modules in order to perform an operation of the present invention, and vice versa.

A module or a programming module according to the present invention may include at least one of the above-described elements, omit a portion thereof, or further include additional other elements. Operations performed by a module, a programming module, or other elements according to the present invention may be executed in a sequential, parallel, or heuristic method. Also, a portion of the operations may be executed in a different sequence, omitted, or other operations may be added.

According to an embodiment of the present invention, a storage medium storing instructions is provided. The instructions, when executed by at least one processor, are set to allow the at least one processor to perform at least one operation. The at least one operation may include recognizing an attribute of a content to be reproduced, acquiring effect information corresponding to the attribute of the content, and applying the acquired effect to a reproducing screen of the content.

A method and apparatus for reproducing a content of an electronic device 101 according to an embodiment of the present invention can improve content reproducing capability, for example, by controlling an operation of the electronic device 101 in association with an attribute of the content to be reproduced. For example, since an additional effect is provided while reproducing the content, not only a user can be more interested in the content but also there is an improvement in convenience in that a content producer does not have to directly add an effect.

Also, an embodiment of the present invention disclosed in the present disclosure and accompanying drawings merely suggest certain examples so as to easily describe the technological content of the present invention and help in the understanding of the present invention, and are not intended to limit the scope and spirit of the present invention. Accordingly, it should be understood that the scope of the present invention includes all modifications or changes drawn on the basis of the technological scope and spirit of the present invention, besides the embodiments disclosed herein, as defined by the appended claims and their equivalents.

What is claimed is:

1. An electronic device, comprising:
a memory configured to store content; and
a processor configured to:
determine an image or a text having a greatest priority among images or texts to be reproduced during at least one duration of the content based on at least one of a size of the image, a length of the text, and a number of repetitions of the text or image,
recognize a keyword corresponding to a context of the duration of the content based on the determined image or text,
provide an effect corresponding to the recognized keyword while the content is reproduced in the duration, and
control an operation of a neighboring electronic device coupled to the electronic device on the basis of the keyword corresponding to the context of the duration of the content while the content is reproduced in the duration.

2. The electronic device of claim 1, wherein the processor is further configured to control at least one of vibration, audio, and display according to the keyword corresponding to the context of the duration of the content.

3. The electronic device of claim 1, wherein the processor is further configured to output a search result for the keyword corresponding to the context of the duration of the content to a part of a content reproducing screen.

4. The electronic device of claim 1, wherein the processor is further configured to be connected to a different electronic device and to receive information on the keyword corresponding to the context of the duration of the content from the connected different electronic device.

5. The electronic device of claim 1, wherein the duration of the content is a frame of the content.

6. The electronic device of claim 2, wherein the processor is further configured to acquire audio corresponding to the keyword corresponding to the context of the duration of the content and to output the audio as background audio of a content reproducing screen.

7. The electronic device of claim 2, wherein the processor is further configured to acquire video corresponding to the keyword corresponding to the context of the duration of the content and to output the video to a part of a content reproducing screen.

8. The electronic device of claim 2, wherein the processor is further configured to output a content reproducing screen with a display brightness according to the keyword corresponding to the context of the duration of the content.

9. A method of operating an electronic device, the method comprising:
determining an image or a text having the greatest priority among images or texts to be reproduced during at least one duration of a content based on at least one of a size of the image, a length of the text, and a number of repetitions of the text or image;
recognizing a keyword corresponding to a context of the duration of the content based on the determined image or text;
providing an effect corresponding to the recognized keyword while the content is reproduced in the duration; and
controlling an operation of a neighboring electronic device coupled to the electronic device on a basis of the keyword corresponding to the context of the duration of the content while the content is reproduced in the duration.

10. The method of claim 9, wherein providing the effect comprises controlling at least one of a screen, vibration, and audio of the electronic device for outputting the duration of the content according to the keyword corresponding to the context of the duration of the content.

11. The method of claim 9, wherein recognizing the keyword corresponding to the context of the duration of the content comprises:
acquiring information on the duration of the content from an internal or external element of the electronic device; and
recognizing the keyword associated with a pre-stored effect based on the acquired information.

12. The method of claim 9, further comprising
acquiring effect information based on a state of the electronic device,
wherein the state of the electronic device comprises at least one of a configuration state and a connection state with respect to an external device.

13. The method of claim 9, further comprising
performing a search function by using the keyword corresponding to the context of the duration of the content as a search word.

14. The method of claim 9, wherein recognizing the keyword corresponding to the context of the duration of the content comprises analyzing the text or the image in the duration of the content.

15. A non-transitory computer readable recording medium for recording a program for executing operations of:
determining an image or a text having the greatest priority among images or texts to be reproduced during at least one duration of a content based on at least one of a size of the image, a length of the text, and a number of the repetitions of the text or image,
recognizing a keyword corresponding to a context of the duration of the content based on the determined image or text;

providing an effect corresponding to the recognized keyword while the content is reproduced in the duration; and controlling an operation of a neighboring electronic device coupled to the electronic device on the basis of the keyword corresponding to the context of the duration of the content while the content is reproduced in the duration.

* * * * *